US008600338B2

(12) United States Patent
Perrott et al.

(10) Patent No.: US 8,600,338 B2
(45) Date of Patent: Dec. 3, 2013

(54) FIRE ALARM TEXT RESPONSE SYSTEM

(76) Inventors: Brent Perrott, Sumner, IL (US); Jake Brian, Sumner, IL (US)

( * ) Notice: Subject to any disclaimer, the term of this patent is extended or adjusted under 35 U.S.C. 154(b) by 0 days.

(21) Appl. No.: 12/931,316

(22) Filed: Jan. 28, 2011

(65) Prior Publication Data
US 2012/0196556 A1 Aug. 2, 2012

(51) Int. Cl.
*H04M 11/04* (2006.01)
(52) U.S. Cl.
USPC ............... 455/404.1; 455/404.2; 455/412.1; 455/412.2; 455/414.1; 455/418; 455/466; 370/310.2; 370/312; 370/328
(58) Field of Classification Search
USPC .......... 455/404.1, 404.2, 412.1, 412.2, 414.1, 455/418, 466; 370/310.2, 312, 328
See application file for complete search history.

(56) References Cited

U.S. PATENT DOCUMENTS

| | | | | |
|---|---|---|---|---|
| 6,535,121 | B2 * | 3/2003 | Matheny | 340/506 |
| 7,076,235 | B2 * | 7/2006 | Esque et al. | 455/404.1 |
| 7,664,233 | B1 * | 2/2010 | Kirchmeier et al. | 379/37 |
| 2006/0133582 | A1 * | 6/2006 | McCulloch | 379/45 |

OTHER PUBLICATIONS

Website: http://comtekk.us/index.htm (specifically: http://comtekk.us/alert-notifier.htm), copyrighted 2005-2011.*
Website: http://www.iamresponding.com/v3/Pages/Default.aspx (specifically, see Learn More heading's drop down hyperlinks), copyrighted 2007-2008.*

* cited by examiner

*Primary Examiner* — Steve D Agosta
(74) *Attorney, Agent, or Firm* — Peter R. Bahn

(57) ABSTRACT

A computer software and hardware system for fire stations is described which provides communications utilizing SMS (Short Message Service) cellular phone text messaging automatically notifying firemen or other personnel of an emergency page when their dispatch pages them via radio dispatch or by other means. Responses from this SMS text message are replied to via SMS text messaging with a code letter and their response is displayed on a screen at their station so other responding firemen know if, who, and where other firemen are responding. Users can also opt to automatically receive on their cell phones an MMS (Multimedia Message Service) message containing a multimedia sound recording of the actual emergency dispatch voice page.

4 Claims, 10 Drawing Sheets

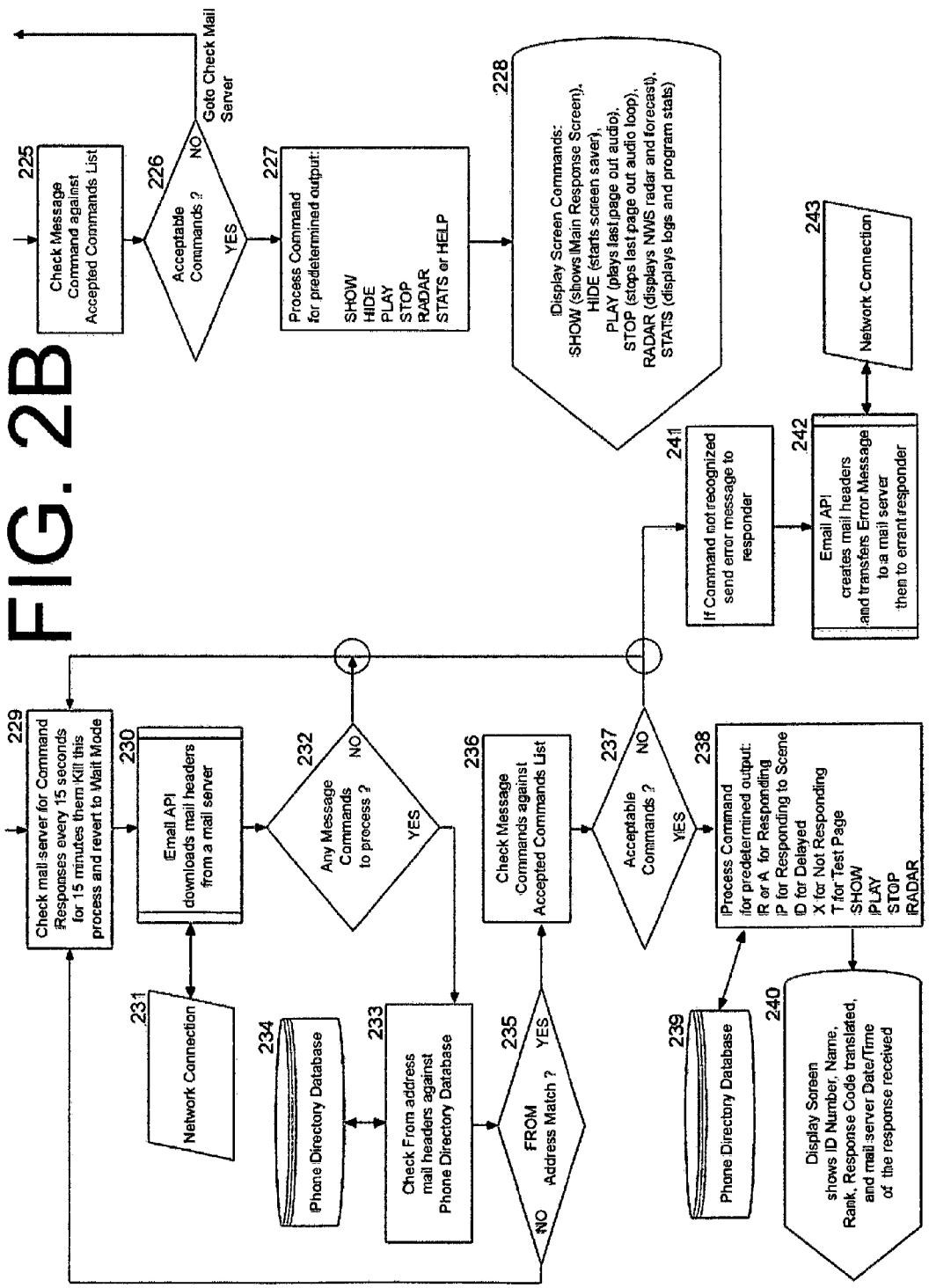

FIG. 3

*FireTextResponse.com*

CHRISTY FIRE STATION - SUMNER 1400
LAST PAGE OUT: 07/25/2010 15:34:35

| FIREMAN ID | NAME | RANK | RESPONSE | ACKNOWLEDGED |
|---|---|---|---|---|
| PAGE# 1 | ************************ | ******************* | PAGE OUT TIME: | 07/25/2010 15:34:35 |
| 1440 | NICK EARNST | FIRE FIGHTER | TEST RECEIVED | 07/25/2010 15:35:16 |
| 1437 | MICHAEL KOCHER | FIRE FIGHTER | RESPONDING | 07/25/2010 15:35:51 |
| 1402 | JEFF PHILLIPS | ASST CHIEF | TEST RECEIVED | 07/25/2010 15:36:31 |
| 1422 | BRENT PERROTT | ASST CHIEF | RESPONDING | 07/25/2010 15:37:05 |
| 14225 | BAP EMAIL | ASST. CHIEF | NOT AVAILABLE | 07/25/2010 15:39:15 |

Current Time: 07/25/2010 15:40:05

——— COM PORT CONNECTED ———
——— NETWORK CONNECTION NORMAL / CONNECT MODE: LAN ———

Config

Checked Server: 19  Playing Page
Minutes Left: 12  Page Mode

FIG. 8

FireTextResponses Log

FTR Startup at: 07/24/2010 23:40:02
*SENT SMS PAGE ALERT MESSAGE* at: 07/24/2010 23:40:07
<<>>>
*Nothing in MMS Phone Directory! at: 07/24/2010 23:40:45
NORMATCH-1422 M BAC[TIM] 07/24/2010 23:40:37#
1422 RESPONDING BAC[TIA] 07/24/2010 23:43:04#
FTR Startup at: 07/25/2010 00:07:16
*SENT SMS PAGE ALERT MESSAGE* at: 07/25/2010 00:07:28
<<>>>
*Nothing in MMS Phone Directory! at: 07/25/2010 00:08:00
NORMATCH-1422 ADG BAC[T,ADG] 07/25/2010 00:08:17#
1422 RESPONDING BAC[TA] 07/25/2010 00:10:33#

FireTextResponse Program Stats (STATS / HELP ) Current Snapshot Every 60 seconds 07/25/2010 14:40:37

CPU Usage: 0% FTR Process Memory: 0 Total Processes: 44
Directory Status: AOK
Message History File Size: 1.50 KB
PageAudio Dir Info: 29 Files / Total Dir Size: 11.17 MB
Last Page Out:
This Session Checked Server: 45 Wait Mode....
Total SMS Receivers: 14

COM Status:
———— COM PORT CONNECTED ————

LAN Status:
Done Reading Directory

COM/LAN Errors:
—————— None ——————

System Up Time: 0 Days 2H:29M:30S

Accepted commands during Page Mode:
Reply R or A for responding to scene, D for delayed,
X for not available, T for test page, PLAYPAGE, STOPPLAY, SHOWSCREEN, RADAR Accepted commands during Wait Mode:
PLAYPAGE, STOPPLAY, SHOWSCREEN, HIDESCREEN, SCREENSAVER, RADAR,
STATS or HELP, PLAYVIDEO, PLAYVIDEO1, PLAYVIDEO2, PLAYVIDEO3,
PLAYVIDEO4, PLAYARMY, ALERT, MMS ON turns on Page Out Audio for your cell,
MMS OFF turns off Page Out Audio for your cell Close

07/25/2010 14:40:45

FIRE ALARM TEXT RESPONSE SYSTEM

BACKGROUND OF THE INVENTION

This invention fits generally into the field of methods or systems used by fire stations for notifying firemen of emergency pages and which permit the firemen to respond to that page. More particularly, this invention is an automated emergency page notification system for firemen that alerts them of a radio page by cell phone text messaging which includes the page audio, allowing them to reply with a response status to a display screen at their fire station so that other personnel know who is responding.

Firefighters, fire chiefs, and fire department board trustees often wonder what the response is going to be on the next fire alarm. They wonder if anyone else is on the way to the fire station or the scene of the fire. They wonder if they should send out a dispatch tone from the fire department again. Should they go ahead and call mutual aid fire departments now? Who is responding to this run? Are they going to be the only one? This situation has happened countless times to firemen across the country. The invention described herein is a fire alarm text response system located at the subject fire station and designed to resolve some of the above uncertainties by providing better information to firemen about the response of other firemen to a fire alarm.

There are a number of fire alarm response systems already in existence which constitute prior art in regard to the present invention. Perhaps the closest prior art systems with respect to the present invention are the following systems: IamResponding, eDispatches, and ComTekk-SafAlertNotifier, which are described in their websites, respectively: Iamresponding.com, edispatches.com, and comtekk.com. However, there are major differences between the present invention and these prior art systems which will now be explained.

IamResponding does not include hardware with their system. Users of this system rely on their pagers to alert them of an emergency page. They then dial an 800 telephone number from any phone by essentially programming one button calling on a phone as autodial to respond to the system. IamResponding also is capable of interfacing with a fire department's E911 dispatch CAD (Computer Aided Dispatch) system where dispatchers send the type and location of fire information to the users' cell phones.

The present system to be described herein sends a text message automatically to the cell phones of users when the fire department's radio dispatch tones them out for an emergency. Users of the present system are sent a message with simple one letter response codes that indicate if they are responding to the fire station, responding to the scene, delayed, not responding, or just a test page. The present system also sends the actual audio of the dispatch page to the users' cell phones automatically as a multimedia audio attachment that the users can play back to hear the actual location and type of emergency. The present system does not interface with E911 systems and does not require any additional dispatcher steps because it detects the dispatch page tones on a radio receiver and alerts the users automatically.

IamResponding features a messaging announcement system for enhanced communications within a fire department or team (the present invention does this with what the present inventors call "Send Message), web-based scheduling (the present invention does not do this), apparatus status tracking (the present invention does not do this), expiration date tracking (the present invention does not do this), and an interactive calendar (the present invention does not do this).

IamResponding is a web-based system requiring no software or unique hardware located at a customer fire station. Customers of IamResponding enter all user information into a web server. The present system is a hardware and software based system located at the customer fire department's station and all user information is kept on the personal computer system at the customer's fire station IamResponding is a web based system where users use their own computers to log into a web page to view responses at the fire station. Users can remain logged into the system and can, if desired, route the video to a larger screen in their fire station truck bay so that responding firemen can see the responses.

The present system includes a flat screen television with the complete system, a dedicated desktop personal computer system, and a radio alert receiver to pick up the page tones and dispatch audio. All department radio pages are recorded and playable anytime from the PC or through commands sent to it via a cell phone, plus the pages are date and time stamped when logged. The present system also plays the actual page audio on a loop through the flat screen TV and PC speakers after a dispatch page out automatically.

eDispatches supplies customers with a personal computer (no keyboard, monitor, or mouse) with a radio scanner. The PC system decodes the pager tones and sends an alert to the eDispatches servers along with the audio of the page. eDispatches then sends a text message to users showing an 800 telephone number for users to call. Users call the 800 number, then enter a PIN number and the system replays the actual audio of the page. The system also calls users entered into the system and then plays the actual audio of the page. If a user does not answer, the system leaves a voice message of the page audio on voicemail or answering machine. eDispatches also is capable of sending out text message announcements to all users in the system. eDispatches is mostly a web based system, as users information is stored on a web server, not at the fire station's PC.

The system presented herein stores all user information on the PC at the users' fire station. The present system sends a text alert and page audio directly from the PC system at the fire station. The present system sends a text message automatically to the cell phones of users when the fire department's radio dispatch tones them out for an emergency. Users are sent a message with simple one letter response codes that indicate if they are responding to the fire station, responding to the scene, delayed, not responding, or just a test page. The present system also sends the actual audio of the dispatch page to the users' cell phones automatically as a multimedia audio attachment that users can play back to hear the actual location and type of emergency. The present system does not interface with E911 systems and does not require any additional dispatcher steps because it detects the dispatch page tones on a radio receiver and alerts users automatically.

eDispatches also uses what they call "eDispatches CAD Relay System" by interfacing with a fire department's E911 CAD system to send type and location information to a user's cell phone via text messaging similar to IamResponding's interface. The present system is independent and does not need to interface with any CAD system. eDispatches' system includes what they call "Priority Blast", which allows users to call in to the eDispatches system, leave a voice message, and it then calls all users with the recorded message. The present system does not do this. eDispatches does not display or accept the status response of a user. eDispatches customers can request an email log of pages and listen to the previous 24 hours of page audio only. The present system can store all page audio for playback anytime.

ComTekk-SafAlertNotifier is an autonomous email/SMS-MMS alert notification system triggered by any programmable single or 2-tone signal such as EAS, NOAA Weather, or fire alarm dispatch radio page. In this system, a small radio receiver is supplied with a computer program that is installed on the customer's own PC system. The system issues alerts on the fire department's radio dispatch tones and then sends out a text message to personnel that a tone was detected. This system also sends the audio of the page via email only for smart phones and mobile phones capable of receiving email with an audio attachment. ComTekk-SafAlertNotifier does not allow the customer or user any way to respond back to alert messages or display any response. ComTekk-SafAertNotifier does not send out the audio as a true MMS audio attachment to a cell phone that does not have email capability. ComTekk-SafAlertNotifier does store user information on the customer's PC at the fire station.

The system presented described herein stores all user information on the PC at the users' fire station like CommTekk-SafAlertNotifier. The present system sends a text alert and page audio directly from the PC system at the customer's fire station similarly to ComTekk-SafAlertNotifier. The present system sends out the page audio as a true MMS (Multimedia Message Service) type message to any cell phone regardless of whether that cell phone has email capability such as a smart phone or not.

The present system will send out page audio as an .mp3 file to any cell phone that has a multimedia package with their cell phone wireless provider. The present system will do this on a PC system running XP or Windows 7 operating systems. It is not possible to send a .wav file due to the large size of files generated to a regular cell phone unless that cell phone, usually a smart phone, is capable of receiving email with large attachments. In the present system, a typical audio attachment is an .mp3 and is only 375 kilobytes in size for 30 seconds of recorded page audio. A .wav file of this size, like the kind that ComTekk-SafAlertNotifier sends, would be approximately 5 megabytes or larger.

The present system sends a text message automatically to the cell phones of users when the fire department's radio dispatch tones them out for an emergency. Users are sent a message with simple one letter response codes that indicate if they are responding to the fire station, responding to the scene, delayed, not responding, or just a test page. The present system also sends the actual audio of the dispatch page to the users' cell phones automatically as a multimedia audio attachment that users can play back to hear the actual location and type of emergency. The present system does not interface with E911 systems and does not require any additional dispatcher steps because it detects the dispatch page tones on a radio receiver and alerts users automatically.

ComTekk-SafAlertNotifier can deal with stacked tones where a dispatch center will tone out fire departments back to back before they announce the emergency. This allows multiple fire departments to be toned at once and then the dispatcher only has to announce the emergency once. ComTekk-SafAlertNotifier must have a standard 1 second gap between fire department tones to work properly. The present system can detect any stacked tone regardless of type or gap. ComTekk-SafAlertNotifier is not capable of sending out special announcement messages like IamResponding, eDispatches, or the present system described herein.

SUMMARY OF THE INVENTION

This invention is a fire alarm text response system for enhancing the communication between a fire department and its associated firemen. A computer running the system software at the fire station is connected through a special cable from the serial com port of the computer to a radio receiver. The radio receiver is capable of receiving and decoding paging tones sent to it by the department's radio dispatch system.

The system software checks the serial com port connected to the radio receiver for a valid decode of the department's radio dispatch paging tones. Upon detection of valid radio dispatch paging tones, the system software immediately sends a text message to all firemen entered into the system phone directory database. This detection is called Page Mode in the system software. The page out time and date plus the page number of the day are then displayed on a screen for firemen to see at the fire station.

The text message sent includes the name of the department paged and instructions of what possible single letter codes to reply with. The firemen or other personnel reply to the text message with a response choice. The system software then checks for replies to the initial text message it sent by checking a mail server every 15 seconds. Upon detection of a text reply (response), the system software then compares the FROM address in the received message mail header to the phone directory database. If the FROM address and the entry in the phone directory database match, then the BODY of the received text message reply is compared to a list of accepted responses.

If the response is accepted, it is shown on a screen for firemen to see. Responses shown include the ID number, Name, Rank, Response Code, and date/time a text message reply was received at the server. Any disallowed response is logged and ignored. Users can send the following commands by text messaging from their cell phones the following when in the Page Mode (upper or lower case):
Reply R or A for responding.
S for responding to scene.
D for delayed.
X for not available.
T for test page.
PLAYPAGE (Plays last Page Out Audio two times over system speakers or monitor if it has speakers). After the system has recorded the Page Out Audio, it will automatically loop play it for 10 minutes so that firemen responding to the station can hear the page again. It can be turned off by the command below.
STOPPLAY (Stops the Page Out Audio if playing).
RADAR (Shows local National Weather Service live looped Doppler radar, updated every 60 seconds).

While the system software is not in Page Mode, it is in Wait Mode. The system software checks a mail server every 60 seconds for a valid command from users entered into the phone directory database. Users can send the following commands by text messaging from their cell phones when in Page Mode (Upper or lower case):
PLAYPAGE (Plays last Page Out Audio twice over system speakers or monitor if it has speakers).
STOPPLAY (Stops the Page Out Audio if playing).
SHOWSCREEN (Shows Response Screen regardless of mode and option running).
HIDESCREEN (Hides Response Screen regardless of mode and stars screen saver).
RADAR (Shows local NWS live looped Doppler radar, updated every 60 seconds).
STATS or HELP (Shows message response log, program statistics, and a list of possible cell commands).
ALERT (A test subroutine which pays a sound).
MMS ON (Turns on Page Out Audio for that cell phone and sends a status message back for confirmation).

MMS OFF (Turns off Page Out Audio for that cell phone and sends a status message back for confirmation).

BRIEF DESCRIPTION OF THE DRAWINGS

FIG. 2A-B shows a computer program flow chart of information processing software utilized by the fire text response system in the present invention.

FIG. 3 shows the MAIN SCREEN of this fire alarm text response system with typical examples of responses from firemen.

FIG. 8 shows the STATS/HELP screen for this system.

DETAILED DESCRIPTION OF THE INVENTION

Figure 1:
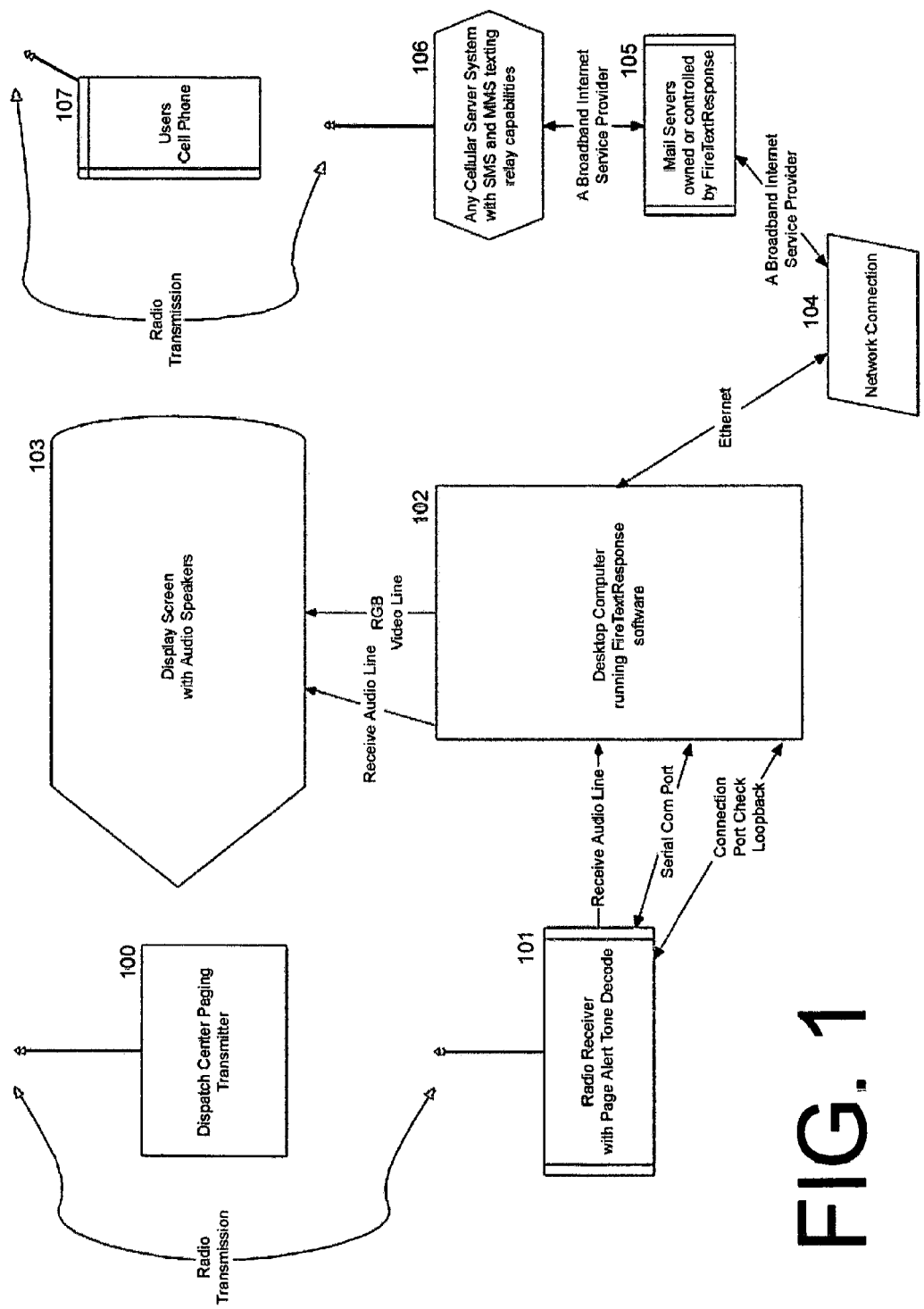
FIG. 1 shows an overview flow chart of the fire alarm text response system hardware employed in the present invention.

As shown in FIG. 1, the hardware of this system, which is usually located at the fire station, is comprised of the following items: A dispatch center paging transmitter 100 sends signals to a radio receiver 101 with a page alert tone decode. The radio receiver is connected by a serial corn port with a desktop computer 102 running the fire alarm text response software for this system. The desktop computer is connected by RGB (red, green, blue) video cable to a display screen 103 with audio speakers. The desktop computer is also connected by the Ethernet with a network connection 104 to a broadband internet service provider. The broadband internet service provider is connected to mail servers 105 that are controlled by the operators of this system. These mail severs are connected by a broadband Internet service provider to any cellular server system 106 with SMS (short message service) and MMS (multimedia message service) texting relay capabilities. The cellular server system sends radio transmission signals to users' cell phones 107.

Figure 2A:
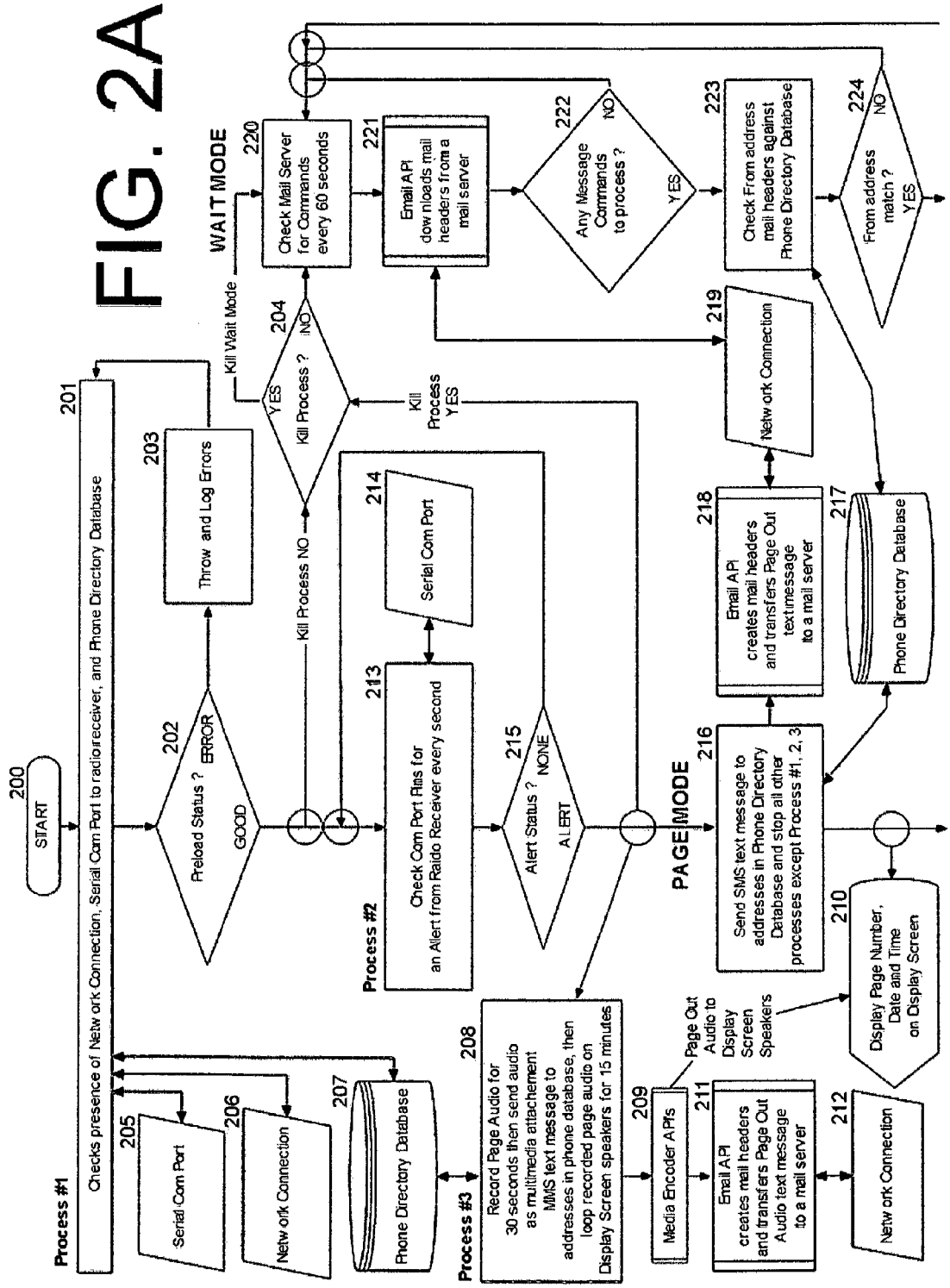

As shown in FIG. 2A and FIG. 2B, the method by which the software of this system works can be divided into four different but connected processes.

Figure 4:
FIG. 4 shows the CONFIG PHONE DIRECTORY ENTRY screen for this system.
Figure 6:
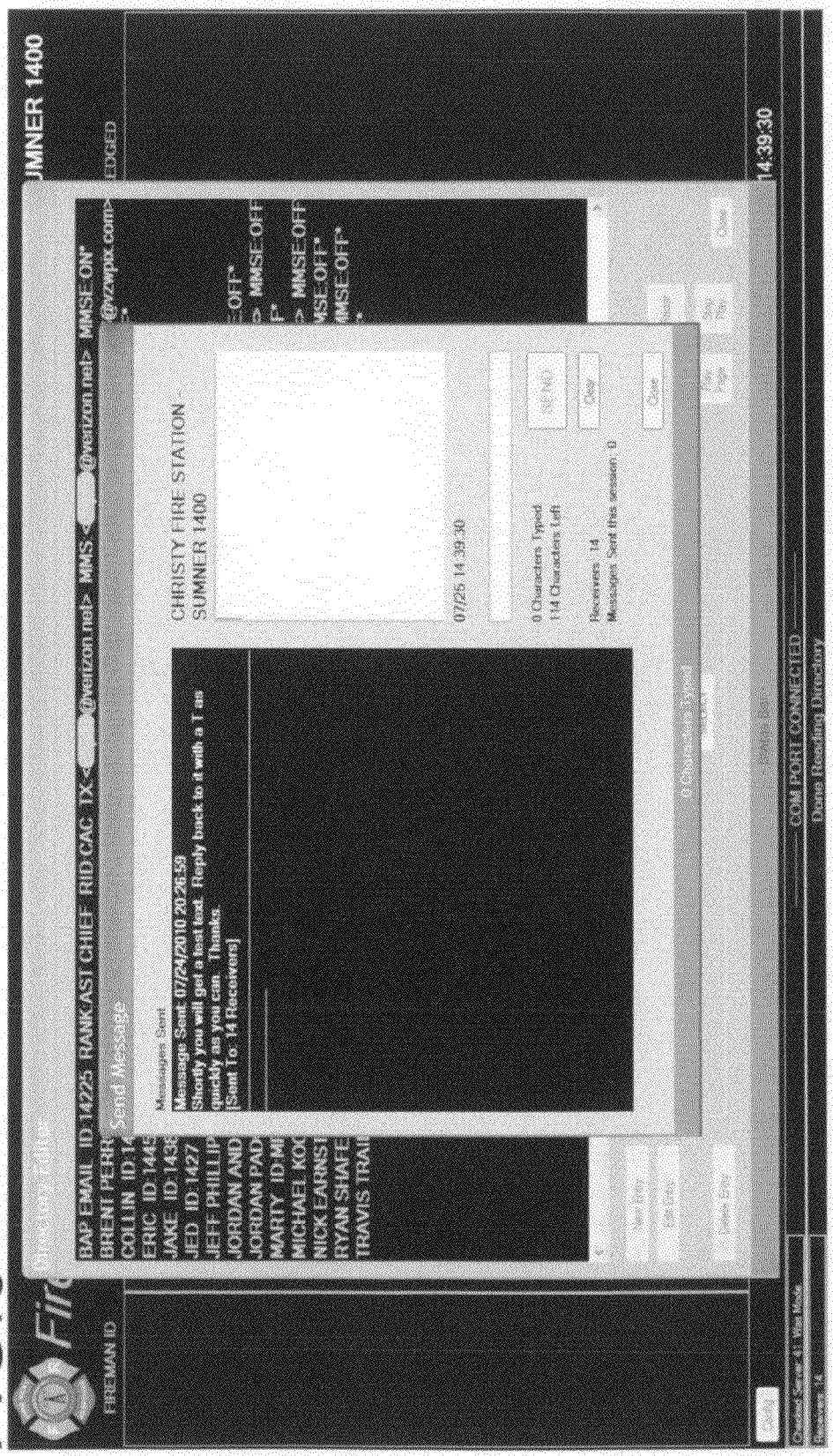
FIG. 6 shows the SEND MESSAGE screen for this system.

In Process #1, after the start button 200 is pressed, the software 201 checks the presence of the serial com port 205, the network connection 206, the VHF radio receiver 101, and the phone directory database 207, screens for which are shown in FIG. 3 and FIG. 4. The Record Page Audio module 208 of the software is displayed for 30 seconds and sends the audio as a multimedia text message to addresses in the database, as shown in FIG. 6, and then sends a loop recorded page audio to display screen speakers for 10 minutes. The above is sent through a Media Encoder and MP3 Encoder APIs 209. The Page Out Audio also shows a display 210 of page number, date, and time on the display screen: An Email API (appliance processor interface) 211 creates mail headers and transfers Page Out Audio Text messages to a mail server which is connected to a network connection 212. If there is an error in the preload status 202, then throw and log errors 203 revert back to the initial check module 201. If the preload status 202 is good, then Process #2 begins.

In Process #2, software module 213 checks com port pins for an alert from the VHF receiver 101 every second and is connected to the serial com port 214. If the alert status 215 is negative then the above process is repeated. If the alert status 215 is positive, then the system goes to the Page Mode. In the Page Mode, the software module 216 sends a SMS text message to addresses in the phone directory database and kills Process #3. In the Page Mode, a Email API 218 creates mail headers and transfers the Page Out Text Message to a mail server, which is connected to a network connection 219. In the Page Mode, the module 216 is also connected to the phone directory database 217. When the kill process 204 is negative, then Process #3, the Wait Mode is operative.

Figure 7:
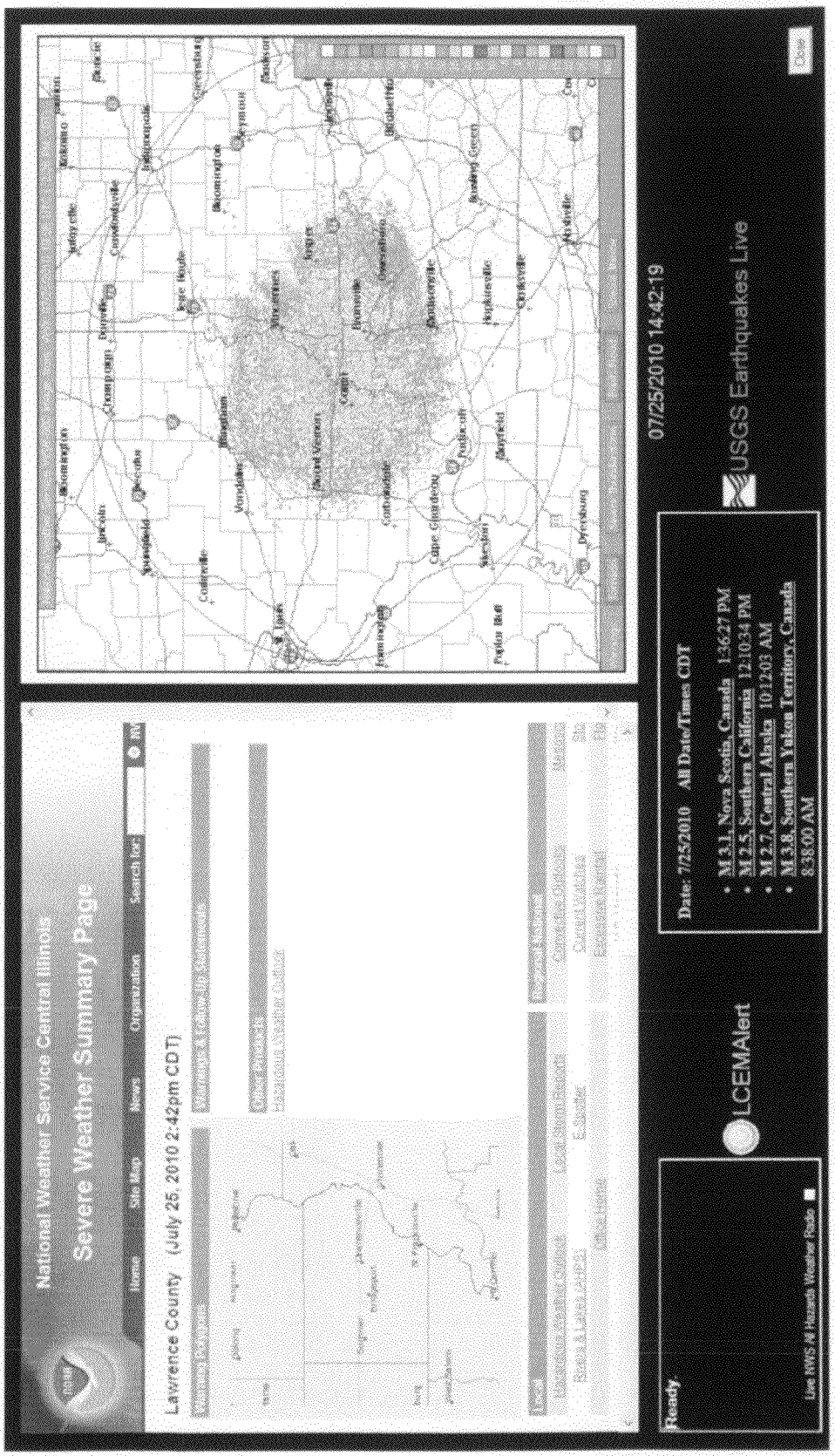
FIG. 7 shows the RADAR screen for this system.
Figure 9:
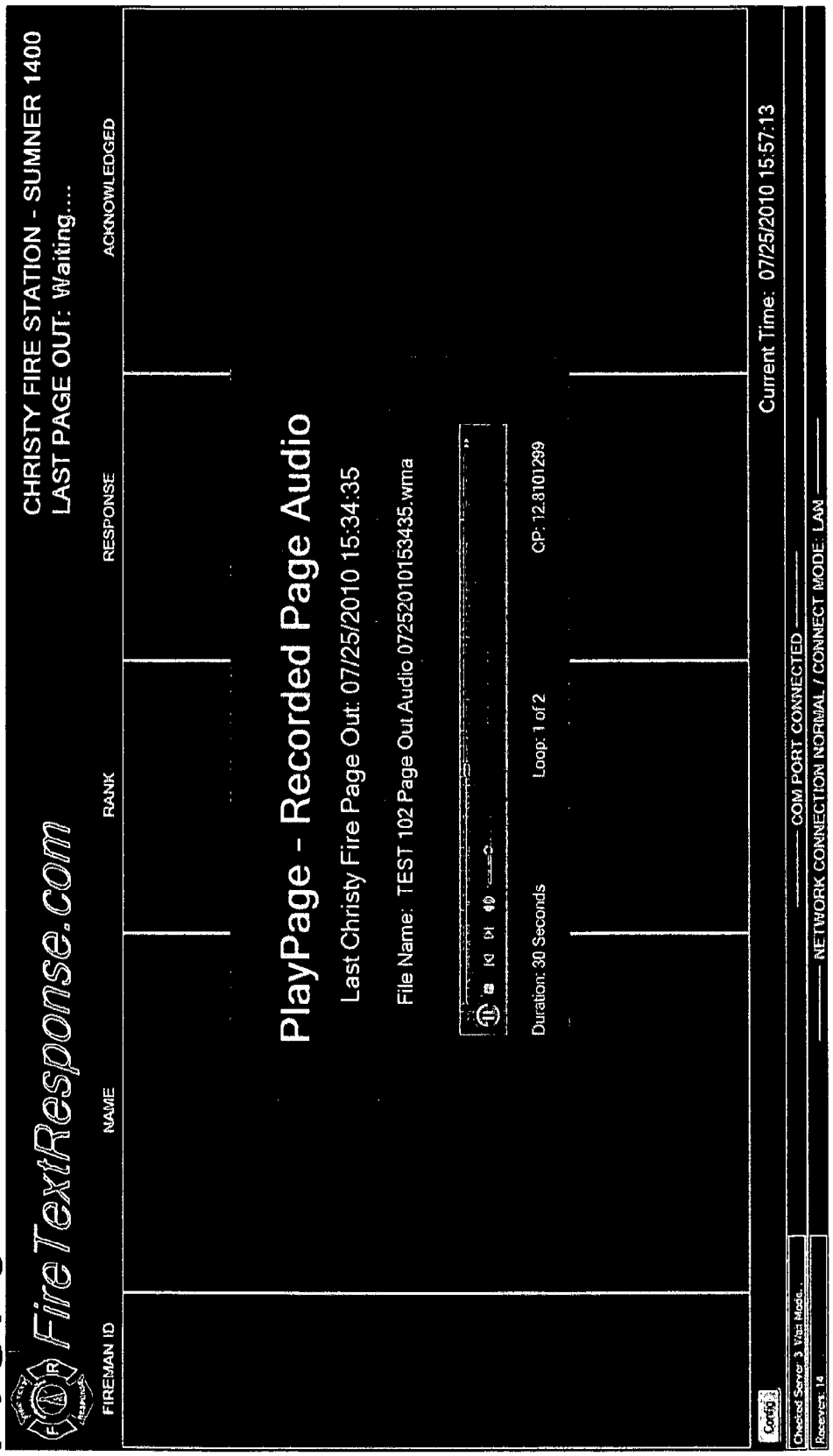
FIG. 9 shows the PLAY PAGE AUDIO screen for this system.

In Process #3, a check mail server 220 looks for commands every 60 seconds while a connected Email API 221 downloads mail headers from a mail server. In connection with the above, a module 222 checks any commands to process. If the answer is no, then Process #3 begins again. If the answer is yes, then software module 223 checks from address mail headers against phone directory database 217. Module 224 looks for an address match. If the answer is no, then Process #3 begins again. If there is an address match, then module 225 checks message commands against accepted commands list. If module 226 finds no acceptable commands, then Process #3 begins again. If there are acceptable commands, then the software consults a process command 227 for predetermined output including SHOWSCREEN, as shown in FIG. 3, HIDESCREEN, PLAYPAGE as shown in FIG. 9, STOPPLAY, RADAR as shown in FIG. 7, STATS and HELP as shown in FIG. 8. The process command 227 sends information to the display screen 228 which shows the Main Response Screen for SHOWSCREEN, starts a screen saver for HIDESCREEN or SCREENSAVER, displays NWS radar for RADAR, and displays logs and program stats for STATS or HELP. This completes Process #3.

Process #4 begins when, in the Page Mode, module 216 has sent out a SMS text message to check mail server 229 which looks for command responses every 15 seconds for 15 minutes, and then kills this process and reverts to the Wait Mode. When there are command responses checked for in module 229, then Email API 230 downloads mail headers from a mail server which is connected to a network connection 231. Software module 232 checks any message commands for processing. If there are no such commands, then Process #4 begins again. If there are such commands, then module 233 checks from address mail headers against the phone directory database 234. Module 235 then checks for an address match. If there is no address match, then Process #4 begins again. If there is an address match, then module 236 checks message commands against an accepted commands list. If there are no acceptable commands, then module 241 sends an error message to the responder, in which case an Email API 242 creates mail headers and transfers an error message for an errant responder to a mail server. This Email API is connected to a network connection 243. If there are acceptable commands found by module 237, then process command 238 for a predetermined output signals R or A for Responding, S for Responding to Scene, D for Delayed, X for Not Responding, T for Test Page, or SHOWSCREEN or RADAR. Process command 238 is connected to the phone directory database 239 and also is connected to a display screen which shows personnel ID number, name, rank, response code translated, and mail server date/time of response received. In FIG. 2A and FIG. 2B, it will be apparent that multiple reference numbers are used for the same piece of computer architecture, such as the phone directory database and Email, for ease of explanation of how the total computer software of this system operates.

The fire alarm text response system described herein is a unique notification system located at the fire station and developed primarily for small to medium size fire departments. The system notifies personnel when a fire department is paged via radio or by other notification means. Firemen receive a text message with instructions on what single letter codes to reply back with. When a fireman responds with his response code, the system displays the response on any monitor large or small, even a large flat screen TV that is capable of a RGB PC monitor input. Such monitors or screens are best placed where fire personnel can easily view them as they put on their gear or enter a truck bay.

Figure 5:
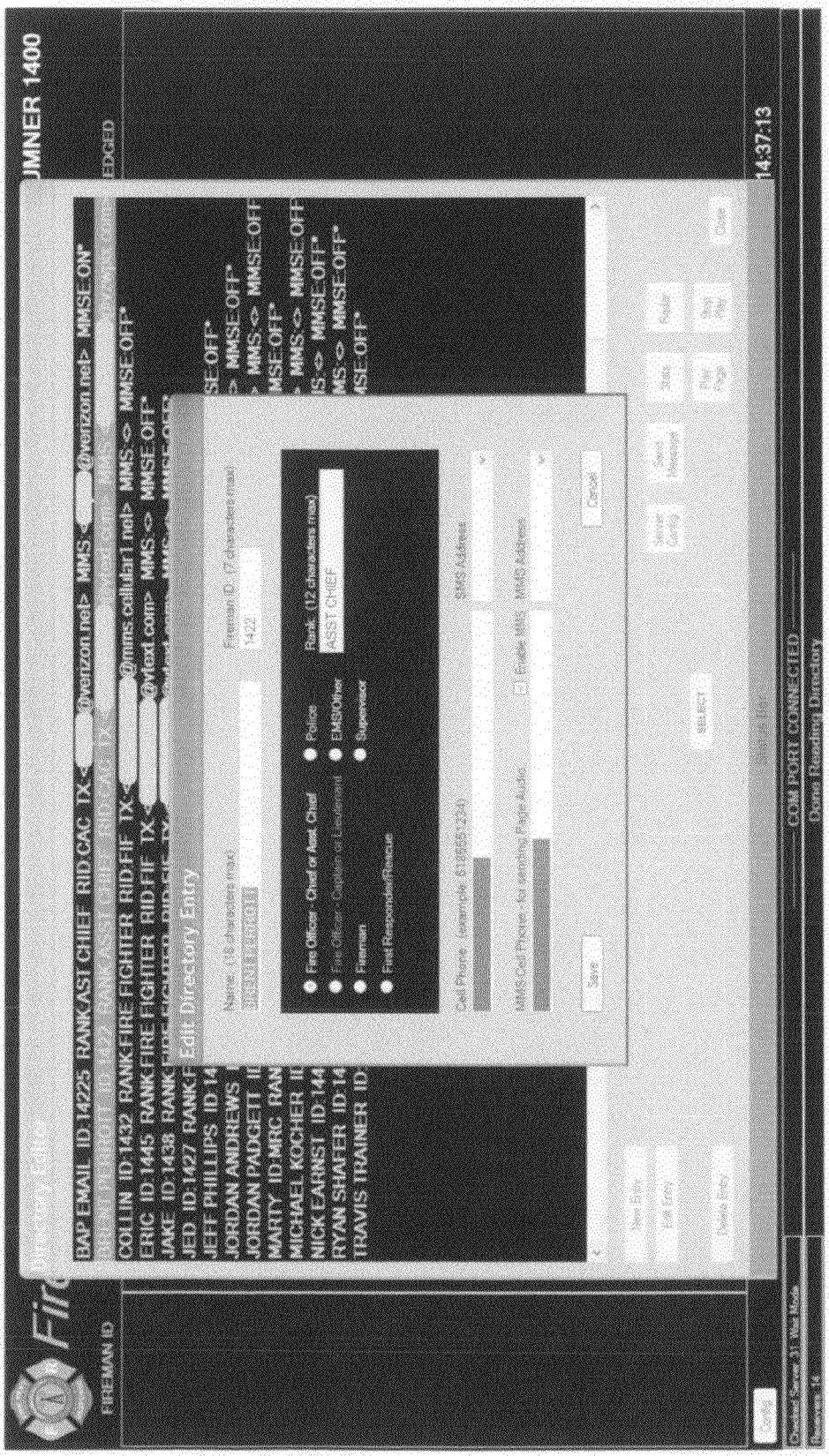
FIG. 5 shows the EDIT DIRECTORY ENTRY screen for this system.

This fire alarm text response system provides select options for entering a department's personnel data into the system phone database, as shown in FIG. 5. Only those personnel that are entered into the phone database that is maintained on the system at the fire station receive and respond to alert messages. The options included by the system for screen displays, as shown in FIG. 4, are fireman radio call ID number, name, and rank. Firemen are color coded as officers, captains or lieutenants, first responders/rescue, EMS, and fire fighters, among others. Responses, as shown in FIG. 3, are displayed in the order that they are received from the system's servers. Any valid response from a fireman also alerts the system operators with an audible sound. Page out date and times are stored in a running log of all system activities including all responses received by the system. These logs and program statistics are viewed by clicking the appropriate buttons on screen or by simply text messaging the system the word STATS from a cell phone, as shown in FIG. 8. Cell phones also send the system text message commands like RADAR to see the latest NWS weather radar from the department's area including storm watches and warnings updated every minute, as shown in FIG. 7. The system also shows that latest earthquakes 2.5 magnitude or greater, nationwide. This system also interfaces with LCEM Alert, an alert system for emergency managers that instantly notifies a county's emergency response agencies of weather alerts, civil emergencies, and other special local, state, and national information or instructions.

This fire alarm text response system practically runs itself. There is no maintenance for the fire department to perform other than keeping the system phone directory up to date with the department's personnel roster. Any system problems are logged and corrected remotely by the system operators. This system works with most cellular wireless providers. This system works with major carriers to allow alert notifications to be as fast as the nation's wireless infrastructure will allow. Typical times for a message to be received by a cell phone range from 5 to 30 seconds, depending on each fireman's wireless cell phone provider and cell tower availability.

The system works in the continental United States and Hawaii. In the working of this system, a fire department's dispatch Page Out Audio is digitally recorded and then immediately sent to any firemen or personnel in the department's Phone Directory. In addition, a fireman can turn this feature on or off through his own cell phone. Department personnel using this feature must have an MMS (multimedia) capable cell phone with the proper cellular wireless plan to allow this feature. A rule of thumb is that if a cell phone can send or receive a picture it can receive the Page Out Audio. The size of the Page Out Audio file sent is very small, about 300 kb and 30 seconds in length. The Page out Audio is specifically compressed for the human voice so quality is kept high.

Typical text examples that arise in the operation of this system with the text messages that appear on the cell phone screen and the meaning of the messages are shown below. FireTextResponse, LLC is used as the name of the internet company that operates this system.

SMS Text Example

From: ftr100@firetextresponse.com (source of the message)
ANYTOWN FIRE PAGE (the station or department as you want it represented on the text message)
Reply R or A for responding. (to station)
S responding to scene. (the scene of the incident)
D delayed. (will not be there for first responding vehicles but will be there as soon as possible. Each department should define what this means for its own purposes. Most departments define delayed as more than approximately 5 to 10 minutes away from being useful to the incident)
X not available (not responding period)
T test page (for when dispatch does the department's test page)
Sent: 5/31 18:01:00 (date and time the message was sent)

Page Out Audio MMS Text Message Example

From: ftr100@firetextresponse.com
ANYTOWN FIRE PAGE OUT AUDIO
Sent: 5/31 18:01:00
Most cell phones will automatically download the audio attachment in the background and then alert when the message has been fully received, about 30 seconds. A few older cell phone models require the user to select and download the audio. Page Out Audio is recorded for 30 seconds and then immediately sent to those firemen in the Phone Directory that are flagged to receive it. They can turn this option on or off anytime the system is in a Wait Mode. Page Out Audio is normally received approximately 45 seconds after initial page out. These times vary from cell carrier to carrier.

Page Mode

When the system has detected a department's dispatch out page, anything the system is doing, including the screen saver, is stopped and a Response Screen is given top priority. The system then checks every 15 seconds for 15 minutes responses sent to it from a cell phone. After 15 minutes, the system reverts to Wait Mode.

Accepted commands from a cell phone during Page Mode are (Upper or lower case, does not matter):
Reply R or A for responding.
S for responding to scene.
D for delayed.
X for not available.
T for test page.
PLAYPAGE (Plays last Page Out Audio two times over speakers or monitor if it has speakers), as shown in FIG. 9. After the system has recorded the Page Out Audio, it will automatically loop play it for 10 minutes so that a fireman responding to the station can hear the page again. It can be turned off by the command below)
STOPPLAY (Stops the Page Out Audio if playing. Can also be stopped via a mouse click from the Response Screen)
RADAR (Shows local NWS live loped Doppler radar, updated every 60 seconds), as shown in FIG. 7.

Wait Mode

When the system is waiting for a page, the system checks every 60 seconds for any commands sent to it from a cell phone. Accepted commands from a cell phone (Upper or lower case, does not matter):
PLAYPAGE (Plays last Page Out Audio twice over system speakers or monitor if it has speakers), as shown in FIG. 9.
STOPPLAY (Stops the Page Out Audio if playing)
SHOWSCREEN (Shows Response Screen regardless of mode and option running)

HIDESCREEN (Hides Response Screen regardless of mode and screen saver)
SCREENSAVER (Hides Response Screen regardless of mode and starts screen saver)
RADAR (Shows local NWS live looped Doppler radar, updated every 60 seconds)
STATS or HELP (Shows message response log, program stats, and list of possible cell commands), as shown in FIG. 8.
MMS ON (Turns on Page Out Audio for that cell, sends a status message back for confirmation)
MMS OFF (Turns off Page Out Audio for that cell, sends a status message back for confirmation)
PLAYVIDEO (The system can play videos that are supplied with the system and can also play videos that the user can supply on the PC by sending this command)
Screen Saver Mode The Screen Saver Mode can only start when the system is in Wait Mode. The Screen Saver starts when no activity with the system has occurred for 1 hour. Even though large LCD and LED flat screens are somewhat immune, they can still have some image burn over time. The Screen Saver reduces this and saves some wear and tear on a big screen. The system operator can also put up to 30 images, .jpg or .bmp, from a department's runs or special events into the UserPics directory. The system adjusts regardless of size or aspect ratio to display the pictures. The lasts system news and updates are also shown through the Screen Saver. Departmental pictures can be turned on anytime in Wait Mode by sending the code SCREENSAVER from a cell phone.

Send Message

When the system operator needs to send out a department wide message, he clicks the Config button on the Response Screen, as shown in FIG. 4, and then clicks the Send Message button. He types a message and then clicks Send, as shown in FIG. 6. This feature is very useful for announcements, training reminders, meeting dates, and other items.

The hardware required to operate this system include the following items: a 32 inch flat screen monitor with a 25 foot extension cable, an Intel brand CPU 2.0 gHz or higher, a System memory of 2 gigabytes or more, a video card with 16:9 widescreen capable 1360 pixel wide screen resolution on board or slotted, an 200 gigabyte or more hard drive, a 9 pin standard serial com port, a sound card with 1 line input or mic input on board or slotted, an Ethernet 100 mb standard on board or slotted, and a wide screen 16:9 system PC monitor.

A broadband internet service connection of 512 kps or higher cable, DSL, or wireless broadband is required for this network system to work. The software for this system was written for XP Professional and Windows 7 Professional as the required computer operating system.

The truck bay monitor or flat screen can be any 16:9 capable wide screen size with an RGB PC input. Since most graphic cards can handle 2 monitors or screens at once, any more than 2 will require an RGB splitter/booster. For use with a large flat screen in the truck bay, an RGB "Y" cable for the system PC monitor is required. A VGA extension cable for the large screen, also has a 3.5 mm plug stereo audio cable that plugs into the PC and TV, all in one cable. A longer or shorter RGB extension cable may be needed depending on how far away the PC is from the truck bay screen. Cable extensions up to 100 feet can be used, but beyond that, an RGB booster amp is required. Also, an uninterruptible power supply greatly enhances performance of this system. A PC 500 to 900 watts is recommended for the PC.

As to VHF/UHF receiver system requirements in the present invention, a conventional OEM (Original Equipment Manufacturer) radio receiver module is interfaced with a proprietary microcontroller interface board that allows the software system on the PC to communicate with the radio receiver. This combination allows the software on the PC to know when a fire department is radio paged and for the PC software to record the actual page out audio of the dispatch.

The receiver system is manufactured by FireTextResponse, LLC in the USA. The receiver is capable of Wide Band (25 kHz channel spacing) reception and Narrow Band (12.5 kHz channel spacing) reception making it compatible with the January 2013 deadline for public safety pool frequency users that are FCC mandated to upgrade to Narrow Band channels. The system also comes with a specially made interface cable manufactured by FireTextResponse, LLC in the USA that interconnects the radio receiver and the PC. An OEM audio impedance filter cable manufactured in the USA is also supplied to eliminate any mismatch or unwanted audio noise between the radio receiver and the PC.

What is claimed is:

1. An automated emergency page notification system for fire stations comprising hardware and software that alerts emergency personnel of an emergency radio page via cell phone text messaging, including the actual audio of the page from their dispatch, and which system allows them to reply with a response status via cell phone text messaging to a display screen at their fire station so that others may know who is responding to the fire station, responding to the scene of the fire, delayed but still responding, or not available to respond, wherein the said hardware is comprised of a desktop computer running the system software and which said computer is connected by a serial com port to a radio receiver with a page alert tone decode which receiver receives radio transmissions from a fire station dispatch paging transmitter, and which said computer is connected by a network connection to mail servers of the said system which such mail servers are connected by an internet broadband service provider to a cellular service system with small message service and multimedia message service texting relay capabilities wherein such cellular service system is connected by radio transmissions to firemen's cell phones, and wherein the said software utilizes a program employing a page mode which sends small message service and multimedia text messages to addresses in a phone directory database of the said system and a wait mode which checks a mail server of the system periodically, and wherein said responses from the firemen to emergency alerts from the fire station are sent via small message service text messaging with code letters indicating a fireman's immediate status.

2. An automated emergency page notification system for fire stations comprising hardware and software that alerts emergency personnel of an emergency radio page via cell phone text messaging, including the actual audio of the page from their dispatch, and which system allows them to reply with a response status via cell phone text messaging to a display screen at their fire station so that others may know who is responding to the fire station, responding to the scene of the fire, delayed but still responding, or not available to respond, wherein the said hardware is comprised of a desktop computer running the system software which said computer is connected by a serial com port to a radio receiver with a page alert tone decode which receiver receives radio transmissions from a fire dispatch paging transmitter, and which said computer is connected by a network connection to mail servers of the said system which such mail servers are connected by an internet broadband service provider to a cellular service system with small message service and multimedia message service texting relay capabilities wherein such cellular service system is connected by radio transmissions to firemen's cell phones, and wherein the said software utilizes a program employing a page mode which sends small message service and multimedia text messages to addresses in a phone directory database of the said system and a wait mode which checks a mail server of the system periodically, and wherein the said firemen can also opt to automatically receive on their cell phones a multimedia message service message containing a multimedia sound recording of the actual emergency dispatch voice page.

3. An automated emergency page notification system for fire stations comprising hardware and software that alerts emergency personnel of an emergency radio page via cell phone text messaging, including the actual audio of the page from their dispatch, and which system allows them to reply with a response status via cell phone text messaging to a display screen at their fire station so that others may know who is responding to the fire station, responding to the scene of the fire, delayed but still responding, or not available to respond, wherein the said hardware is comprised of a desktop computer running the system software and which said computer is connected by a serial com port to a radio receiver with a page alert tone decode and which receiver receives radio transmissions from a fire station dispatch center paging transmitter, and which said computer is connected by a network connection to mail servers of the said system and which such mail servers are connected by an internet broadband service provider to a cellular server system with small message service and multimedia message service texting relay capabilities wherein such cellular server system is connected by radio transmissions to firemen's cell phones, wherein said responses from the firemen to emergency alerts from the fire station are sent via small message service text messaging with code letters indicating a fireman's immediate status, and wherein the said firemen can also opt to automatically receive on their cell phones a multimedia sound recording of the actual emergency dispatch voice page.

4. An automated emergency page notification system for fire stations comprising hardware and software that alerts emergency personnel of an emergency radio page via cell phone text messaging, including the actual audio of the page from their dispatch, and which system allows them to reply with a response status via cell phone text messaging to a display screen at their fire station so that others may know who is responding to the fire station, responding to the scene of the fire, delayed but still responding, or not available to respond, wherein the said hardware is comprised of a desktop computer running the system software which said computer is connected to by a serial com port to a radio receiver with a page alert tone decode which receiver receives radio transmissions from a fire dispatch paging transmitter, and which said computer is connected by a network connection to mail servers of the said system which such mail servers are connected by an internet broadband service provider to a cellular server system with small message service and multimedia message service texting relay capabilities wherein such cellular server system is connected by radio transmissions to firemen's cell phones, and wherein the said software utilizes a program employing a page mode which sends small message service and multimedia text messages to addresses in a phone directory database of the said system and a wait mode which checks a mail server of the system periodically, wherein said responses from the firemen to emergency alerts from the fire station are sent via small message service text messaging with code letters indicating a fireman's immediate status, and wherein the said firemen can also opt to automatically receive on their cell phones a multimedia message service message containing a multimedia sound recording of the actual emergency dispatch voice page.

\* \* \* \* \*